(12) United States Patent
Jegganathan

(10) Patent No.: US 12,151,579 B1
(45) Date of Patent: Nov. 26, 2024

(54) POWER CONTROLLING DEVICE FOR USE WITH EV CHARGERS

(71) Applicant: PwrPac LLC, Houston, TX (US)

(72) Inventor: Balu Jegganathan, Houston, TX (US)

(73) Assignee: PwrPac LLC, Houston, TX (US)

( * ) Notice: Subject to any disclaimer, the term of this patent is extended or adjusted under 35 U.S.C. 154(b) by 0 days.

(21) Appl. No.: 18/386,144

(22) Filed: Nov. 1, 2023

(51) Int. Cl.
| | |
|---|---|
| B60L 53/62 | (2019.01) |
| B60L 53/10 | (2019.01) |
| B60L 53/55 | (2019.01) |
| H02J 7/00 | (2006.01) |
| H02J 7/34 | (2006.01) |

(52) U.S. Cl.
CPC ............... *B60L 53/62* (2019.02); *B60L 53/11* (2019.02); *B60L 53/55* (2019.02); *H02J 7/00712* (2020.01); *H02J 7/345* (2013.01)

(58) Field of Classification Search
CPC ......... Y02T 10/70; Y02T 90/14; Y02T 90/12; B60L 53/66; B60L 53/63; B60L 58/12; B60L 53/62; B60L 53/67; B60L 53/11; B60L 53/60; B60L 2240/70; B60L 2240/72; B60L 53/50; B60L 53/55; H02J 7/02
See application file for complete search history.

(56) References Cited

U.S. PATENT DOCUMENTS

| | | | | |
|---|---|---|---|---|
| 2011/0055037 | A1* | 3/2011 | Hayashigawa | ......... B60L 53/16 705/26.1 |
| 2020/0164755 | A1* | 5/2020 | Smolenaers | ............ B60L 53/53 |
| 2021/0288512 | A1* | 9/2021 | Krishnan | .................. H02J 7/35 |
| 2023/0411967 | A1* | 12/2023 | Finn | ...................... H01M 10/44 |

* cited by examiner

*Primary Examiner* — Elim Ortiz

(74) *Attorney, Agent, or Firm* — Flaster Greenberg P.C.

(57) ABSTRACT

Systems, methods, and apparatus are described herein for a power-controlling device for use with EV chargers. One or more embodiments disclosed herein may include a stand-alone device which, when installed, may reduce the likelihood of the owner of the EV charger being hit with high utility demand charges. The device may include one or more supercapacitors (e.g., supercapacitor banks, which may be series/parallel combinations) which may aid in making stored energy available during periods of peak energy demand. The supercapacitors may charge during periods of normal (e.g., non-peak) energy demand, and may discharge stored energy during periods of peak energy demand, which may reduce the likelihood of peak charges being applied. This device may appeal to property owners concerned about installing EV chargers due to the possibility of being penalized by high energy costs, and may result in an increase in the number of charging stations available to the public.

12 Claims, 7 Drawing Sheets

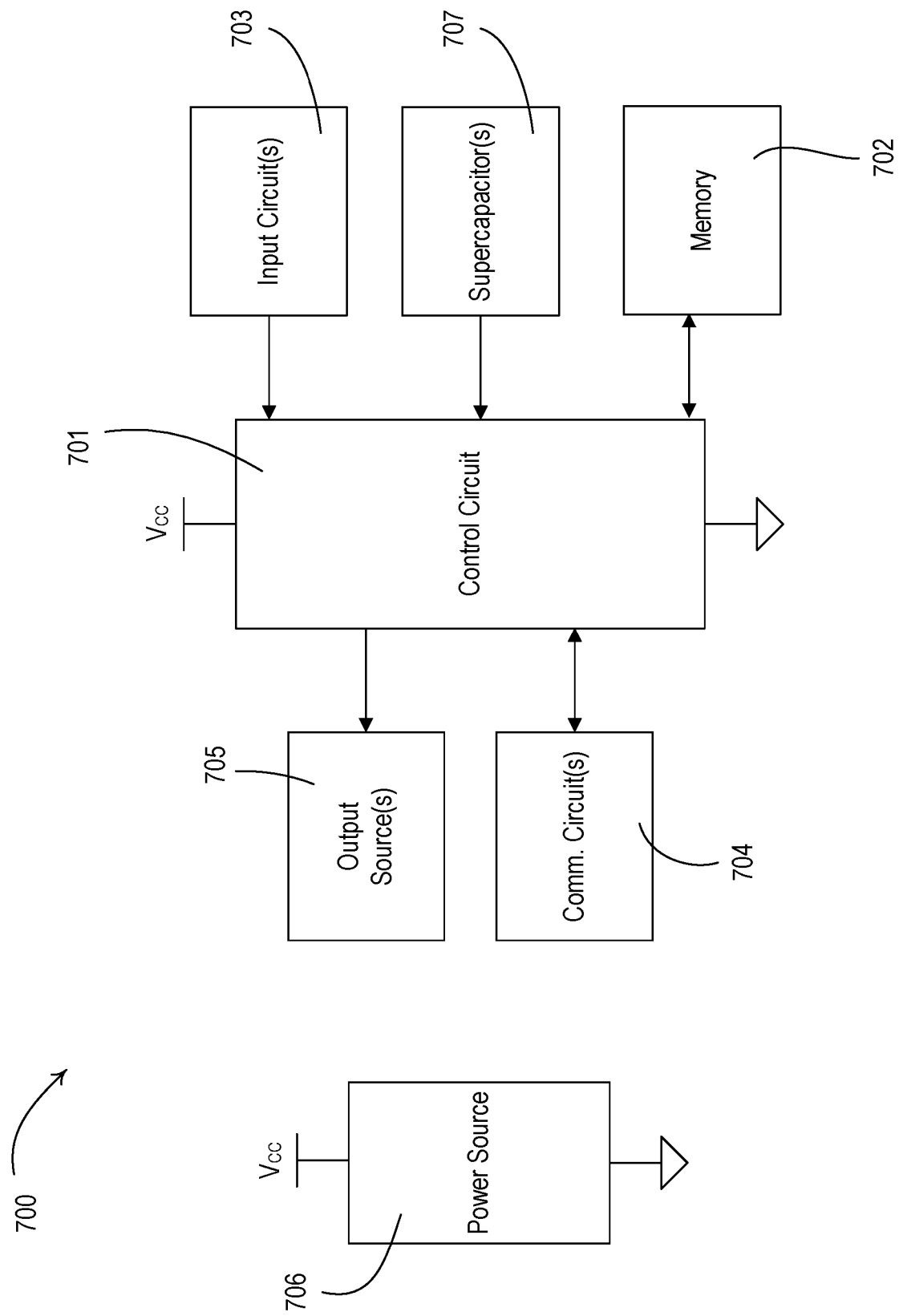

POWER CONTROLLING DEVICE FOR USE WITH EV CHARGERS

BACKGROUND

With the rapid growth of electric vehicles (EVs), there is an increased demand for more public and private charging stations. However, there may be a cost penalty that can discourage potential owners from installing these charging stations on their property. This is due (at least in part) to the triggering of 'peak energy charges' from the provider, even when only a brief high energy demand occurs, such as charging multiple vehicles simultaneously.

EV chargers may take power directly from a grid (e.g., from a utility provider), and energy costs may be billed to the owner/host of the charger or charge station. High demand (e.g., peak) charges may be experienced when multiple vehicles are connected simultaneously to a charging unit(s), and the utility demand exceeds a certain threshold value. This may even be for a short time, however once peak charges are triggered, they may be applied over an extended period, even when the actual demand has been reduced.

Direct Current Fast Chargers (DCFC) may be used to provide rapid charging of EVs when travelling away from home or a local base. These charging stations are increasing in power capacity (e.g., >300 kW charging power) to meet demand for consumers. However, this increase may contribute to peak energy charges being applied to the owners of the units.

Battery modules may be used to buffer peak energy demands. However, batteries may take a relatively long time to charge.

SUMMARY

Systems, methods, and apparatus are described herein for a power-controlling device for use with EV chargers. One or more of the embodiments disclosed herein may include a stand-alone device positioned between the electricity supply and the charging station that manages the energy demand, and may reduce the likelihood of peak charges being applied by the utility provider. This device may appeal to property owners who are concerned about installing EV chargers due to the possibility of being penalized by high energy costs, and may result in an increase in the number of charging stations becoming available to the public.

For example, one or more embodiments disclosed herein may include a stand-alone device which, when installed, may reduce the likelihood of the owner (e.g., provider) of the EV charger being hit with high utility demand charges. The device may go between the EV charging station(s) and the electrical supply. Inside the device may be an Energy Management System (EMS) that controls and allows electrical power to be delivered in such a way that peak demand charges should not be triggered by use of the EV charger(s) alone.

The device may include one or more supercapacitors, which may aid in making stored energy available during periods of peak energy demand. The internal components of the device may ensure rapid charging can be maintained, by controlling and buffering demand, especially when multiple vehicles are connected.

For example, one or more embodiments disclosed herein may include a power-controlling device. The power-controlling device may be configured to be connected to one or more (e.g., two or more) charging stations, where each charging station may be configured to provide power to a respective EV via a respective output. The charging stations may be fast charging stations. The power-controlling device may include one or more supercapacitors configured to store energy received from an energy source (e.g., a mains power source). The power-controlling device may include a control circuit. The control circuit may determine that an EV has connected to the power-controlling device (e.g., via one of the charging stations). The control circuit may determine an energy demand value, and may compare the energy demand value to a threshold value. The control circuit may determine the energy demand value based on an amount of energy discharged to one or more EVs from the at least one supercapacitor within a predetermined amount of time and/or an amount of energy discharged to the one or more EVs from the energy source within the predetermined amount of time. The control circuit may determine the threshold value, for example based on a value stored in memory.

If the energy demand value is greater than the threshold, the control circuit may provide power to the EV from the supercapacitor(s). If the energy demand value is less than or equal to (e.g., not greater than) the threshold, the control circuit may provide power to the EV (e.g., directly) from the energy source. The control circuit may determine a power level of the supercapacitor(s), and may charge the supercapacitor(s) using energy from the energy source if the power level is less than 100%.

BRIEF DESCRIPTION OF THE DRAWINGS

FIG. 7 is a block diagram illustrating an example of a power-controlling device.

DETAILED DESCRIPTION

One or more of the embodiments disclosed herein may use supercapacitor(s) for energy storage. For example, the supercapacitor(s) may be part of a power-controlling device.

A supercapacitor may be a type of capacitor that may have a relatively high capacitance and/or a lower voltage limit (e.g., compared to other capacitors). Supercapacitors, also known as ultracapacitors, may have several unique features, including but not limited to a relatively high power density (e.g., 8-10 wH/kg), a relatively wide operating temperature range (e.g., −5 C to 95 C), a relatively high efficiency (e.g., 95-98%), and/or a relatively long cycle life (e.g., 90% cycle efficiency). Supercapacitors may have charging and discharging times similar to other (e.g., conventional) capacitors, thus making them ideal in achieving significant charge and discharge currents.

Energy storage may be essential for stabilizing output during voltage drops and the introduction of large loads. Supercapacitors may provide backup power to keep critical systems operational for short periods (e.g., several minutes after a power outage). These products may be scalable, and may ensure adequate coverage by injecting power to support facilities, microgrids, and utilities, while reducing the risk of costly downtime Supercapacitor energy storage systems may have numerous advantages over stand-alone battery storage systems. Apart from supercapacitors' applications in a supply grid, they may also have various applications in transportation systems. Further, supercapacitors may be used in other applications (e.g., commercial buildings) to reduce grid consumption at peak demand times and ease power loading. For example, large supercapacitors (e.g., 4 megawatt (MW) systems) may be installed in commercial buildings (e.g., in Japan) to reduce grid consumption at peak demand times and ease loading.

A power-controlling device that includes one or more supercapacitor(s) may be used as part of an electric vehicle (EV) charging unit that is used to charge an EV. For example, the EV charging unit (e.g., an EV charger) and/or the power-controlling device may receive power from an energy grid (e.g., which may be referred to as an energy host, an energy source, and/or an electrical supply) via a power line. An (e.g., each) EV charging unit may be located on public or private premises, and may have a power-controlling device installed thereon.

Figure 1:
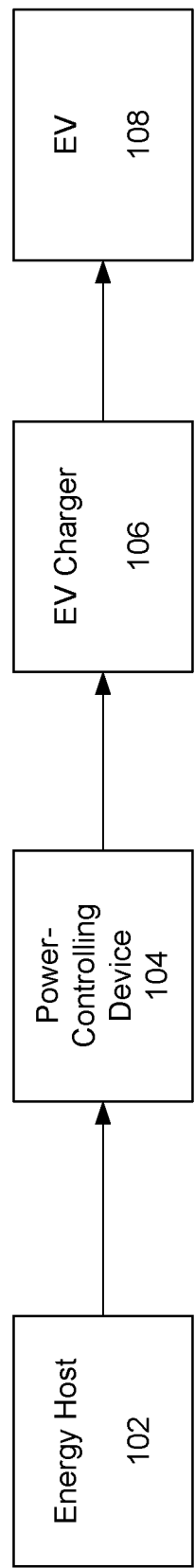
FIG. 1 is a diagram that illustrates a power-controlling device connected to a single EV charging unit.

FIG. 1 is a diagram that illustrates a power-controlling device 104 connected to a single EV charging unit (e.g., an EV charger) 106. For example, as shown in FIG. 1, a consumer may plug their EV 108 into the EV charger 106, which may be connected to an energy host 102 that provides mains electricity via a power line. The EV charger 106 may be a standard EV charger. Alternatively, the EV charger 106 may be a fast charger. The power-controlling device 104 (e.g., that includes one or more supercapacitor(s)) may be electrically connected to the EV charger 106. For example, the power-controlling device 104 may connect to the EV charger 106 via approved electrical plug/socket/wiring, that may be commensurate with local codes and/or regulations (e.g., which may include, but are not limited to, codes and/or regulations regarding a mains voltage/frequency, a type of socket used, and/or any other relevant codes and regulations). As noted above, the power-controlling device 104 may include one or more supercapacitors configured to store energy. The power-controlling device 104 may be located between the energy host 102 and the EV charging station 106. For example, the power-controlling device 104 may receive energy from the energy host 102, and may provide energy to the EV 108 (e.g., via the EV charger 106).

Figure 2:
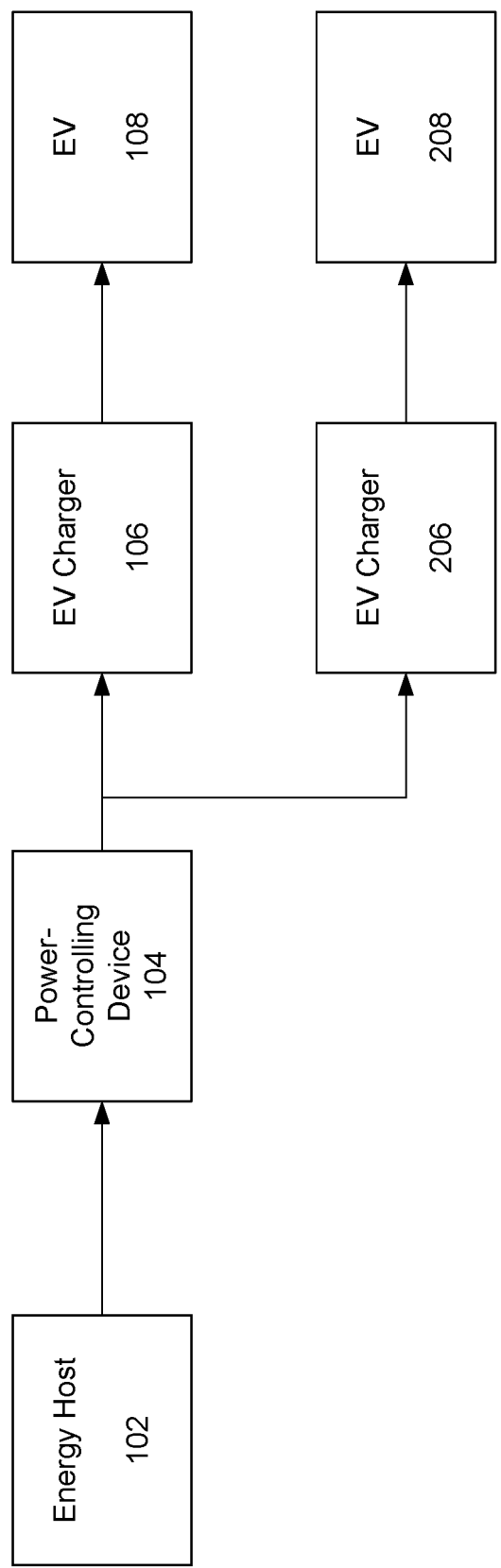
FIG. 2 is a diagram that illustrates a power-controlling device connected to a plurality of EV charging units.

Although FIG. 1 shows a power-controlling device 104 that is connected to a single EV charger 106, the single power controlling-device 104 may be connected to a plurality of EV charging units 106, 206. For example, FIG. 2 is a diagram that illustrates the power-controlling device 104 connected to a plurality of EV charging units 106, 206. As shown in FIG. 2, the power-controlling device 104 may be connected to a first EV charger 106, which may provide energy to a first EV 108, and a second EV charger 206, which may provide energy to a second EV 208. The number of EV charging units that the power-controlling device 104 is able to connect to may be dependent on a capability of the power-controlling device 104.

The power-controlling device 104 may allow for conventional charging from the grid through the EV charging unit under normal (e.g., non-peak) power consumption, but may ensure that the bank of supercapacitor(s) in the power-controlling device 104 are charged and available to buffer the demand should it reach or approach peak level. For example, the power-controlling device 104 may include a control circuit that may determine an energy demand value and compare the energy demand value to a threshold value. If the energy demand value is greater than the threshold, the control circuit may provide power to the EV 108 and/or the EV 208 from the supercapacitor(s). If the energy demand value is less than or equal to (e.g., not greater than) the threshold, the control circuit may provide power to the EV 108 and/or the EV 208 (e.g., directly) from the energy host 102. The supercapacitor(s) may receive energy from the energy host 102, and may recharge when the supercapacitor(s) are not discharging energy to an EV (e.g., and when the power consumption is below a threshold).

Figure 3:
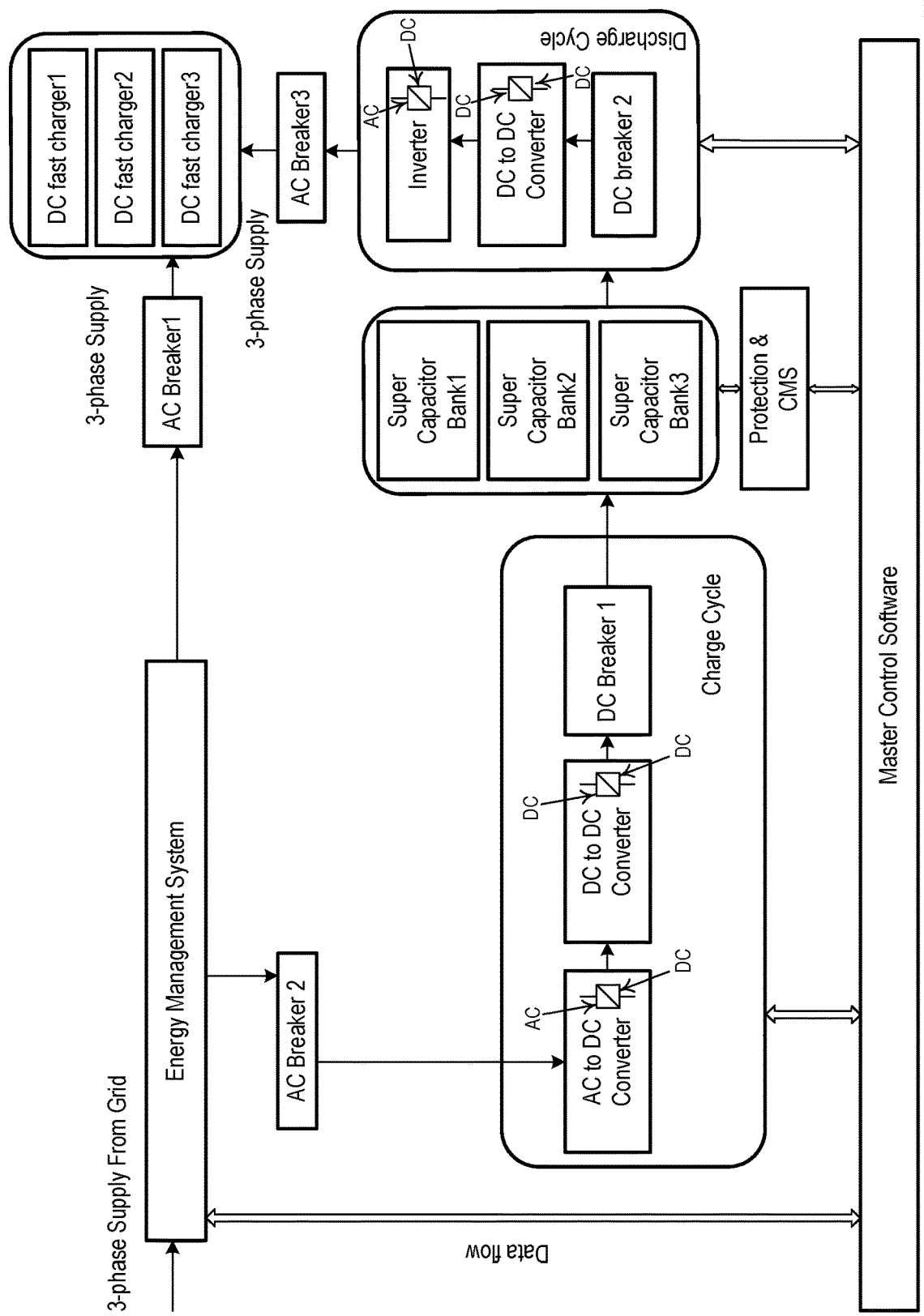
FIG. 3 is a diagram that illustrates a supercapacitor-based energy storage system (ESS).

FIG. 3 is a diagram that illustrates a supercapacitor-based energy storage system (ESS). For example, the diagram illustrated in FIG. 3 may be a representation of the internal components of a power-controlling device that includes a supercapacitor (e.g., a supercapacitor module or bank, which may be a set of supercapacitors in series/parallel combinations), and may illustrate the connections between the various components. For example, the ESS may be and/or may include the control circuit described herein.

As shown in FIG. 3, the ESS may include master control software (MCS). The MCS may be an energy management block that can manage the energy demand and eliminate or reduce likelihood of peak demand charges being applied by the utility provider. The MCS may include a memory, a control circuit (e.g., a processor), and one or more connections to other devices and/or components. For example, the memory may store instructions that, when executed by the control circuit, cause the control circuit to perform one or more actions. Additionally and/or alternatively, the MCS may include and/or interact with non-transitory computer readable media having instructions stored thereon that, when executed by the control circuit, cause the control circuit to perform the one or more actions. The non-transitory computer readable media may be internal or external to the MCS.

The ESS may include one or more breakers (e.g., AC and/or DC breakers) that may ensure control and subsequent power capacity to flow. For example, as shown in FIG. 3, there may be a first DC breaker (e.g., DC Breaker 1), a second DC breaker (e.g., DC Breaker 2), a first AC breaker (e.g., AC Breaker 1), a second AC breaker (e.g., AC Breaker 2), and/or a third AC breaker (e.g., AC Breaker 3). The ESS may further include one or more converters and/or inverters. For example, as shown in FIG. 3, the ESS may include one or more AC to DC converters and/or one or more AC to DC converters. A converter and/or an inverter may be connected to a breaker. The converters and/or inverters (e.g., and/or the combination thereof) may provide necessary voltages to fulfill requirements.

The ESS may include a protection and control block (e.g., Protection & CMS). The protection and control block may ensure safety voltage and current limitations to charge and discharge the supercapacitor(s).

The ESS may be operatively coupled to one or more inverters. The ESS may also be operatively coupled to a buck-boost DC to DC converter (e.g., which may be placed between the ESS and the inverter). The buck-boost converter may act as a zero volt transition (ZVT) buck to charge supercapacitor and/or as a ZVT Boost to discharge supercapacitor. The inverter may release stored energy from the ESS during periods of high energy demand and/or regulate energy peaks. Using a buck-boost converter may allow or more control over the dispensing of energy as compared to other systems. For example, using the buck-boost converter may increase safety of the system as a whole, and may allow the ESS (e.g., and/or the power-controlling device) to have more control over decisions (e.g., how much energy is required to be dispensed at any given time, what a current demand value is, etc.).

Circuit designs exploiting the increased energy storage provided by supercapacitors may require careful consideration of the increased power handling (e.g., compared to that of batteries) when charging these devices. One or more Electrochemical Double-Layer Capacitors (EDLCs) may be used. The unique composition of EDLCs may inherently allow them to withstand large currents (e.g., such as those present when using a supercapacitor).

Uncontrolled charging of an uncharged supercapacitor may result in the power supply experiencing near short circuit conditions. The resulting rate at which the voltage changes over time (e.g., dV/dt) across charge supply semiconductors may create permanent damage or a transient upset due to the voltage drop on critical power lines of the system.

As shown in FIG. 3, the ESS may include an energy management system (EMS). The EMS may be a system of computer-aided tools used by operators of electric utility grids to monitor and/or control. For example, the EMS may receive information from the grid regarding energy demand, and may be able to verify compliance with local codes and/or regulations and/or to react to the information received from the grid. The EMS may perform safety checks during operation of the power-controlling device. For example, the EMS may monitor an operating temperature of the power-controlling device (e.g., in order to shut down or reduce a power level of the power-controlling device if the operating temperature goes above a threshold), and/or may monitor for a fire within the power-controlling device. In the case of a fire, the EMS may notify a higher-level system and/or deploy a fire suppressant. The EMS may receive commands for controlling the power-controlling device (e.g., from one or more utilities via the utility grid). There may be two separate functions for monitoring and controlling.

As shown in FIG. 3, the EMS may connect a 3-phase supply from a grid (e.g., main lines) to an input of a DC fast charger input via an AC breaker (e.g., AC breaker 1). If the power demand increases (e.g., passes a threshold), the EMS may switch on a second AC breaker (e.g., AC breaker 3 shown in FIG. 3), which may allow the ESS to discharge energy from the supercapacitor(s). For example, the second AC breaker may be controlled by the MCS to supply a 3-phase supply from the inverter to the DC fast chargers, as a peak demand input supply.

The ESS may be responsible for information exchange through internal/external communications with a Controller Area Network (CAN). For example, the ESS may be responsible for sending a state-of-charge (SoC) status to a graphical user interface (GUI) associated with the EV charger, and/or for storing important data for guarantee and warranty purposes, such as report generation in case of fault conditions, recording periodically the charge/discharge history, etc.

The ESS shown in FIG. 3 may perform a charge cycle. For example, during periods of normal (e.g., non-peak) operation, the bank of supercapacitors may be in a charging cycle, which may use one or more of the following components: an AC to DC converter (e.g., a rectifier), a DC to DC converter, and/or a DC breaker (e.g., DC Breaker 1).

The rectifier may be a type of converter that changes an input AC signal into a DC, and that is designed to convert a fixed value of AC signal voltage into a DC voltage.

The DC to DC converter may be used to convert the DC signal level present at the input into a DC signal level at the output (e.g., which may be a different level than that of the input). Generally, power transistors, MOSFETs, and thyristors may be the semiconductor devices used for their fabrication. The output may be controlled by a low power signal that controls these semiconductor devices from a control unit.

The DC breaker (e.g., DC Breaker 1) may be controlled by the MCS to allow charging of the supercapacitor banks.

The ESS shown in FIG. 3 may perform a discharge cycle. For example, during periods where peak energy demands (e.g., demand above a threshold) are being reached (e.g., or are close to being reached), the ESS may cause the bank of supercapacitors to enter a discharge cycle, which may require one or more of the following components: a DC breaker (e.g., DC Breaker 2), a DC to DC converter, and/or an inverter.

The DC breaker (e.g., DC Breaker 2) may be controlled by the MCS to supply voltage to the DC to DC converter.

The DC to DC converter may convert the DC signal level present at the input to a DC signal at the output, which may be at a different level than that of the input.

The inverter may be used to convert the DC signal back into an AC signal. The applied input may be a fixed DC voltage obtained from the DC to DC converter, and the output obtained may be a variable AC voltage.

Figure 4:
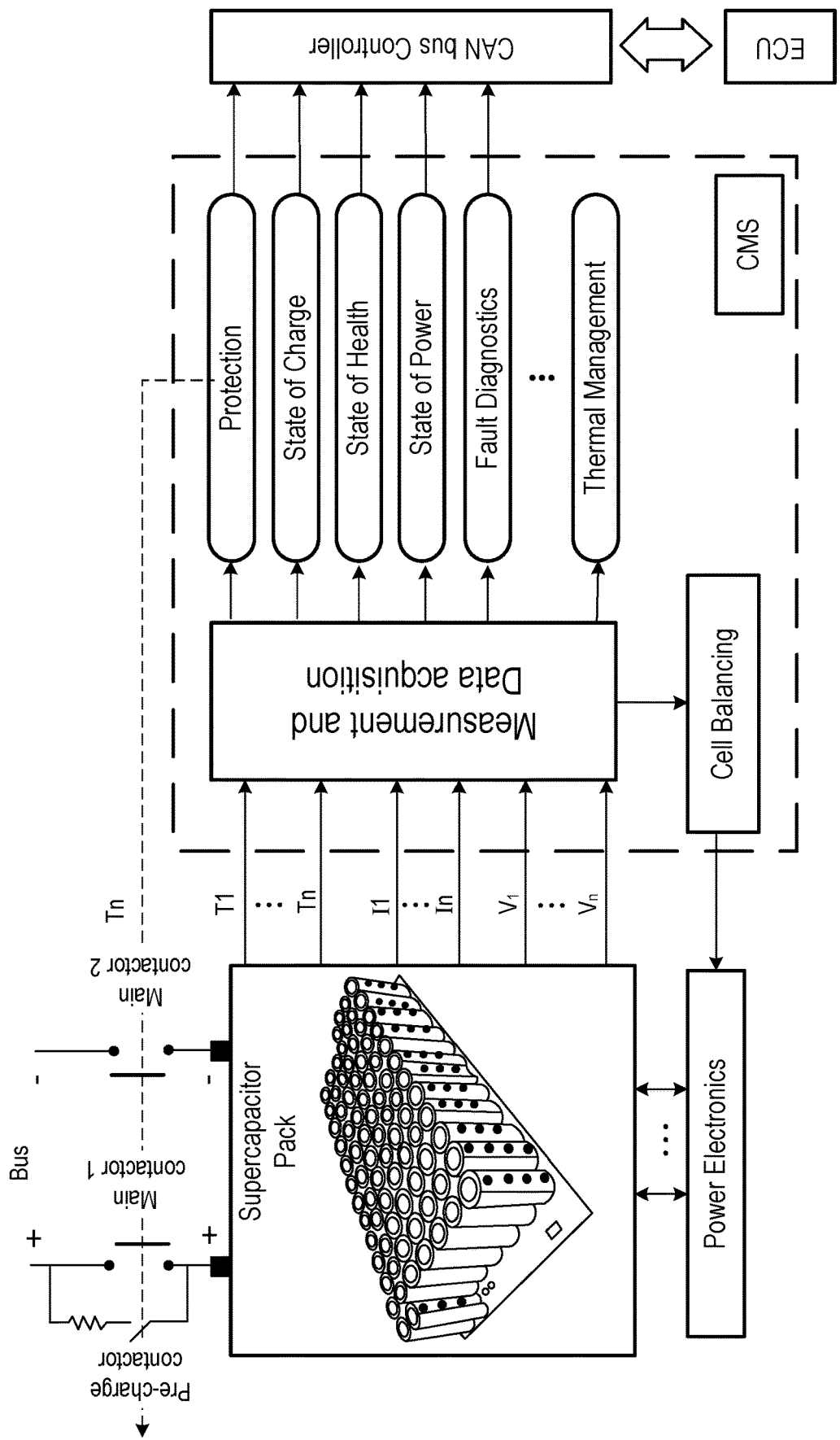
FIG. 4 illustrates an example of master control software (MCS) that includes a capacitance management system (CMS).

FIG. 4 illustrates an example of master control software (MCS) that includes a capacitance management system (CMS). CMS may be defined as a system that manages a supercapacitor pack. Such a system may include electronic and control systems for measurement, acquisition, and processing of the key variables, mechanical systems such as contactors/fuses to limit the charge/discharge current in normal/abnormal conditions, and/or any other possible software/hardware technology. For example, the CMS may be used as part of the MCS shown in FIG. 3.

Referring again to FIG. 4, implementation of effective CMSes may mitigate problems by enabling accurate estimation of the internal states as well as effective management and protection of the supercapacitor cells in different operating conditions. This may improve the performance, safety, and lifetime of the supercapacitor pack.

Inputs to the CMS may include sensory circuitry (e.g., sensors, supply and pull-up circuitry, interface electronics such as voltage dividers, analog to digital converters, etc.), for example to measure the current of the main circuit, and several voltage sensors to measure cell voltages. Likewise, temperature sensors such as Negative Temperature Coefficient (NTC) sensors, Positive Temperature Coefficient (PTC) sensors, and/or thermocouples may be used to measure the cells' temperatures, temperature across the pack, and/or the temperature of the inlet and outlet cooling liquids for thermal management. General-purpose inputs such as the system ON/OFF commands, signals from interlocks to distinguish the charging conditions, etc. may also be used.

As shown in FIG. 4, the CMS may communicate with an Electronic Control Unit (ECU) and/or a Battery Management System (BMS), to collaboratively define the charge/discharge power limits in different operating conditions. Likewise, the CMS may control the operation of the contactors to restrain the inrush current caused by the start-up, or when the current is extremely high due to abnormal or abusive usage. Additionally, the CMS may generate alarms to indicate abnormal conditions and information signals to show the temperature, State-of-Charge (SoC), etc.

The CMS may perform measurement and data acquisition. For example, as shown in FIG. 4, the CMS may be used to measure and/or provide information signals that indicate a protection status associated with one or more supercapacitors, an SoC associated with the one or more supercapacitors, a state of health associated with the one or more supercapacitors, a state of power associated with the one or more supercapacitors, fault diagnostics associated with the one or more supercapacitors, and/or thermal management associated with the one or more supercapacitors. The CMS may also be used for cell balancing.

As shown in FIG. 4, the CMS may be in communication and/or operatively coupled to one or more supercapacitors (e.g., the supercapacitor pack shown in FIG. 4), one or more power electronics, a CAN bus controller, the BMS, and/or the ECU.

Figure 5:
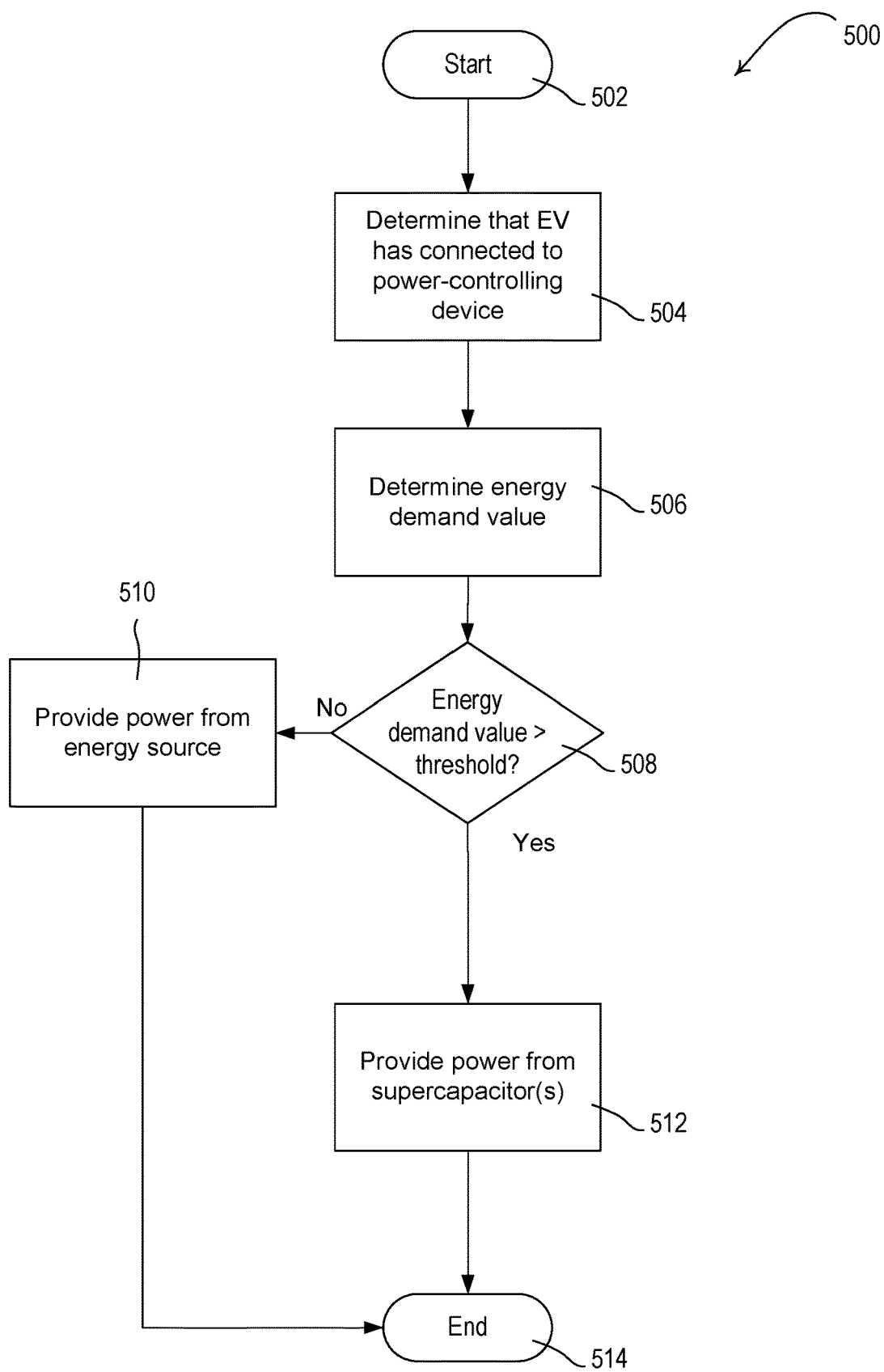
FIG. 5 is a flowchart of an example procedure for providing power to an electric vehicle (EV).

FIG. 5 is a flowchart of an example procedure 500 for providing power to an electric vehicle (EV). The procedure 500 may be performed by a power-controlling device, such as the power-controlling device 104 shown in FIGS. 1 and 2. For example, the procedure 500 may be performed by a control circuit within the power-controlling device 104. The procedure 500 may be stored in memory as computer-readable or machine-readable instructions that may be executed by the control circuit of one or more devices for executing the procedure. Though the procedure 500 may be described herein as being performed by a single device, such as a power-controlling device, the procedure 500, or portions thereof, may be performed by another device or distributed across multiple devices, such as a wired/wireless processor and/or one or more other devices.

The procedure 500 may begin at 502. At 504, the power-controlling device (e.g., the control circuit of the power-controlling device) may determine that an electric vehicle (EV) has connected to the power-controlling device. For example, the power-controlling device may be connected to one or more EV charging stations (e.g., EV chargers), and the power-controlling device may determine that the EVs have connected to one of the one or more EV charging stations. Each EV charging station may be a standard charging station or a fast-charging station. For example, each EV charging station may be configured to provide power to a respective EV via one or more respective outputs. Each EV charging station may provide power at a rate of, for example, 30 kilowatts (kW) per hour, 50 KW per hour, or 100 KW per hour. The power-controlling device may receive an indication from the EV charging station to which the EV has connected, and may determine that the EV has connected to the power-controlling device (e.g., via the EV charging station) based on receiving the indication.

At 506, the power-controlling device (e.g., the control circuit of the power-controlling device) may determine an energy demand value. The power-controlling device may determine the energy demand value based on an amount of energy discharged to one or more EVs from at least one supercapacitor within a predetermined amount of time and/or an amount of energy discharged to the one or more EVs from the energy source within the predetermined amount of time. The energy demand value may be determined based on an amount of energy required by the one or more EVs (e.g., and/or based on a limit of the power-controlling device itself). The power-controlling device may determine the energy demand value based on an algorithm (e.g., an internal control algorithm). At 508, the power-controlling device may compare the energy demand value to a threshold value. For example, the power-controlling device may determine whether the energy demand value is greater than the threshold value. The power-controlling device may determine the threshold value, for example based on a value stored in memory. The threshold value may be pre-defined or variable, for example based on a location of the power-controlling device. The threshold value may be set by an owner of the power-controlling device. The threshold value may have a default value (e.g., that can later be updated by the owner).

If the power-controlling device determines that the energy demand value is greater than the threshold at 508, the control circuit may provide power to the EV from one or more supercapacitor(s) at 512. For example, the power-controlling device may include and/or be operatively connected to the supercapacitor(s). The supercapacitor(s) may perform as described herein. Additionally or alternatively, the power-controlling device may determine a storage level associated with the supercapacitor(s) (e.g., a relative energy level of the supercapacitor(s)). The power-controlling circuit may determine that an amount of energy stored in the supercapacitor(s) is below (e.g., less than or equal to) a second threshold, and may provide power to the EV from the energy source at a rate that is less than a maximum rate. Alternatively, the power-controlling circuit may determine that an amount of energy stored in the supercapacitor(s) is greater than (e.g., or equal to) the second threshold, and may provide power to the EV from the supercapacitor(s). The power-controlling device may measure an amount of power and/or energy provided to the EV from the supercapacitor(s) and may store an indication of the amount of power and/or energy in the memory. The procedure 500 may end at 514.

If the power-controlling device determines that the energy demand value is less than or equal to (e.g., not greater than) the threshold at 508, the power-controlling device may provide power to the EV (e.g., directly) from the energy source at 510. For example, the power-controlling device may provide the power to the EV while bypassing the supercapacitor(s). The power-controlling device may measure an amount of power and/or energy provided to the EV from the energy source and may store an indication of the amount of power and/or energy in the memory. The procedure 500 may end at 514.

Figure 6:
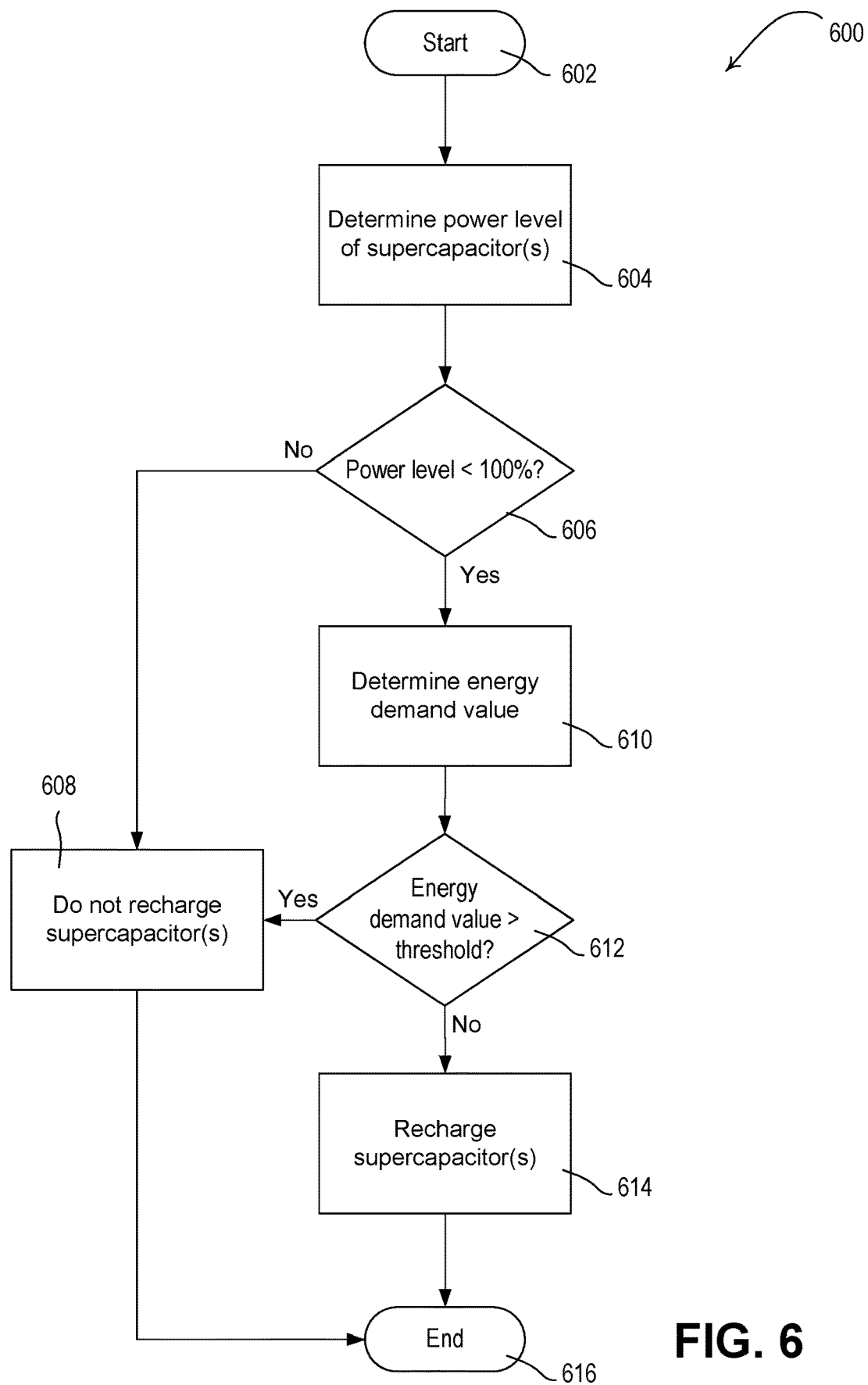
FIG. 6 is a flowchart of an example procedure for recharging a supercapacitor.

The procedure 500 and the procedure 600 described in FIG. 6 may be performed together (e.g., sequentially and/or concurrently) by the power-controlling device. For example, after the power-controlling device provides power to the EV from the supercapacitor(s) at 512, the power-controlling device may determine the power level of the supercapacitor(s) at 604. The power-controlling device may then perform the remaining steps of the procedure 600 described in FIG. 6.

FIG. 6 is a flowchart of an example procedure 500 for recharging a supercapacitor. The procedure 600 may be performed by a power-controlling device, such as the power-controlling device 104 shown in FIGS. 1 and 2. For example, the procedure 600 may be performed by a control circuit within the power-controlling device 104. The procedure 600 may be stored in memory as computer-readable or machine-readable instructions that may be executed by the control circuit of one or more devices for executing the procedure. Though the procedure 600 may be described herein as being performed by a single device, such as a power-controlling device, the procedure 600, or portions thereof, may be performed by another device or distributed across multiple devices, such as a wired/wireless processor and/or one or more other devices.

The procedure 600 may begin at 602. At 604, the power-controlling device (e.g., the control circuit of the power-controlling device) may determine a power level of one or more supercapacitors. The power-controlling device may determine the power level based on one or more values stored in a memory of the power-controlling device. For example, the power-controlling device may determine the power level based on one or more of an amount of energy in the supercapacitors at a given time, an amount of energy discharged by the supercapacitors within a given time period, an amount of energy demand at a given time, and/or the like. The supercapacitor(s) may be included in and/or operatively connected to the power-controlling device. The determined power level may be a relative power level. For example, the power level may be determined with reference to a maximum power level of the one or more supercapacitors (e.g., in terms of a percentage). If there is more than one supercapacitor, the power-controlling device may determine an average power level of the supercapacitors.

At 606, the power-controlling device may determine whether the power level of the supercapacitors is less than the maximum power level (e.g., whether the supercapacitors are fully charged). If the power-controlling device determines that the power level of the supercapacitors is not less than the maximum power level (e.g., the supercapacitor(s) are fully charged) at 606, the power-controlling device may delay recharging the supercapacitor(s) (e.g., may not recharge the supercapacitor(s)) at 608 and the procedure 600 may end at 616.

If the power-controlling device determines that the power level of the supercapacitors is less than the maximum power level (e.g., the supercapacitor(s) are not fully charged) at 606, the power-controlling device may determine an energy demand value at 610. For example, the power-controlling device may determine the energy demand value as described with reference to step 506 of the procedure 500 of FIG. 5.

Referring again to FIG. 6, at 612 the power-controlling device may compare the energy demand value to a threshold value. For example, the power-controlling device may compare the energy demand value to the threshold value as described with reference to step 508 of the procedure 500 of FIG. 5.

Referring again to FIG. 6, if the power-controlling device determines at 612 that the energy demand value is greater than (e.g., or equal to) the threshold, the power-controlling device may delay recharging the supercapacitor(s) (e.g., may not recharge the supercapacitor(s)) at 608. Alternatively, if the power-controlling device determines at 612 that the energy demand value is less than (e.g., or equal to) the threshold, the power-controlling device may recharge the supercapacitor(s) at 614. The power-controlling device may recharge the supercapacitor(s) by providing energy to the supercapacitor(s) from the energy source. The power-controlling device may recharge the supercapacitor(s) until the supercapacitor(s) have reached the maximum power level (e.g., the supercapacitor(s) are 100% charged). The power-controlling device may stop providing power to the supercapacitor(s) once the power level of each supercapacitor has reached the maximum power level. The procedure 600 may end at 616.

FIG. 7 is a block diagram illustrating an example of a power-controlling device 700. The power-controlling device 700 may be the power-controlling device 104 described in FIGS. 1 and 2.

Referring again to FIG. 7, the power-controlling device 700 may include a control circuit 701 for controlling the functionality of the device 700. The control circuit 701 may include one or more general purpose processors, special purpose processors, conventional processors, digital signal processors (DSPs), microprocessors, integrated circuits, a programmable logic device (PLD), application specific integrated circuits (ASICs), and/or the like. The control circuit 701 may perform any functionality that enables the power-controlling device 700 to perform as described herein. For example, the control circuit 701 may perform one or more of the steps of the procedures 500 and/or 600. The control circuit 701 may include and/or may be the ESS described in FIG. 3.

The control circuit 701 may be communicatively coupled to a memory 702, and may store information in and/or retrieve information from the memory 702. The memory 702 may comprise computer-readable storage media and/or machine-readable storage media that maintains any values or indicators described herein, and/or computer-executable instructions for performing as described herein. For example, the memory 702 may comprise computer-executable instructions or machine-readable instructions that include one or more portions of the procedures described herein. The control circuit 701 may access the instructions from memory 702 for being executed to cause the control circuit 701 to operate as described herein, or to operate one or more other devices as described herein. The memory 702 may comprise computer-executable instructions for executing configuration software and/or control software. The computer-executable instructions may be executed to perform one or more procedures described herein.

The memory 702 may include a non-removable memory and/or a removable memory. The non-removable memory may include random-access memory (RAM), read-only memory (ROM), a hard disk, and/or any other type of non-removable memory storage. The removable memory may include a subscriber identity module (SIM) card, a memory stick, a memory card, and/or any other type of removable memory. The memory 702 may be implemented as an external integrated circuit (IC) or as an internal circuit of the control circuit 701.

The power-controlling device 700 may include one or more communication circuits 704 that are in communication with the control circuit 701 for sending and/or receiving information as described herein. The communication circuit 704 may perform wireless and/or wired communications. The communication circuit 704 may be a wired communication circuit capable of communicating on a wired communication link. The wired communication link may include an Ethernet communication link, an RS-485 serial communication link, a 0-10 volt analog link, a pulse-width modulated (PWM) control link, a Digital Addressable Lighting Interface (DALI) digital communication link, and/or another wired communication link. The communication circuit 704 may be configured to communicate via power lines (e.g., the power lines from which the device 700 receives power) using a power line carrier (PLC) communication technique. The communication circuit 704 may be a wireless communication circuit including one or more RF or infrared (IR) transmitters, receivers, transceivers, and/or other communication circuits capable of performing wireless communications.

Though a single communication circuit 704 is illustrated in FIG. 7, multiple communication circuits may be implemented in the power-controlling device 700. The power-controlling device 700 may include a communication circuit configured to communicate via one or more wired and/or wireless communication networks and/or protocols, and at least one other communication circuit configured to communicate via one or more other wired and/or wireless communication networks and/or protocols. For example, a first communication circuit may be configured to communicate via a wired or wireless communication link, while another communication circuit may be capable of communicating on another wired or wireless communication link. The first communication circuit may be configured to communicate via a first wireless communication link (e.g., a wireless network communication link) using a first wireless protocol (e.g., a wireless network communication protocol), and the second communication circuit may be configured to communicate via a second wireless communication link (e.g., a short-range or direct wireless communication link) using a second wireless protocol (e.g., a short-range wireless communication protocol).

The control circuit 701 may be in communication with one or more input circuits 703 from which inputs may be received. For example, the input circuits 703 may receive input from one or more EV charging stations.

The control circuit 701 may be in communication with one or more output sources 705. For example, the output sources 705 may include a USB port (e.g., or another type of port), which may allow the power-controlling device 700 to connect to another device (e.g., a computer).

Each of the hardware circuits within the power-controlling device 700 may be powered by a power source 706. The power source 706 may include a power supply configured to receive power from an alternating-current (AC) power supply or direct-current (DC) power supply, for example. For example, as described herein, the power-controlling device 700 may receive energy from an energy source (e.g., power lines) that are connected to one or more charging station(s). The power source 706 may produce a supply voltage $V_{CC}$ for powering the hardware within the device 700.

The power-controlling device 700 may include one or more supercapacitors 707. For example, the supercapacitors 707 may store energy received from the energy host, and may discharge energy to one or more EVs via one or more charging stations. The supercapacitors 707 may perform as described herein.

What is claimed is:

1. A power-controlling device configured to be connected to two or more charging stations, each charging station being configured to provide power to one or more respective electric vehicles (EVs) via one or more respective outputs, the power-controlling device comprising:
   a memory;
   at least one supercapacitor configured to store energy received from an energy source; and
   a control circuit configured to:
      determine that one of the respective EVs has connected to the power-controlling device via the respective output of one of the two or more charging stations, wherein the respective charging stations are fast-charging stations configured to provide power to the EV at a rate of at least 30 kilowatts (KW);
      determine an energy demand value; and
      compare the energy demand value to a first threshold value, wherein the first threshold value is based on a geographical location of the power-controlling device, and wherein:
      the control circuit is configured to provide power to the EV from the at least one supercapacitor based on the energy demand value being greater than the first threshold value;
      the control circuit is configured to, based on the energy demand value being not greater than the first threshold value:
         provide power to the EV from the energy source;
         determine a power level of the at least one supercapacitor; and
         charge the at least one supercapacitor using energy from the energy source based on the power level of the at least one supercapacitor being less than 100%; and
      the control circuit is configured to, based on the energy demand value being greater than the first threshold value:
         determine that an amount of energy stored in the at least one supercapacitor is below a second threshold value; and
         provide power to the EV from the energy source at a rate that is less than a maximum rate;
      wherein the control circuit is further configured to:
         measure an amount of energy provided to the EV from the supercapacitor; and
         store an indication of the amount of energy provided to the EV from the supercapacitor in the memory of the power-controlling device.

2. The power-controlling device of claim 1, wherein the fast-charging station is configured to provide power to the EV at a rate of at least 50 kilowatts (kW).

3. The power-controlling device of claim 1, wherein the fast-charging station is configured to provide power to the EV at a rate of at least 100 kilowatts (KW).

4. The power-controlling device of claim 1, wherein the indication comprises a first indication, and wherein the control circuit is further configured to:
   receive a second indication from the fast-charging station that the EV has connected to the power-controlling device via the respective output of the fast-charging station; and
   determine that the EV has connected to the power-controlling device based on receiving the second indication.

5. The power-controlling device of claim 1, wherein the control circuit is configured to determine the first threshold value based on a value that is stored in the memory.

6. The power-controlling device of claim 1, wherein the control circuit being configured to determine the energy demand value comprises the control circuit being configured to:
   determine an amount of energy discharged to one or more EVs from the at least one supercapacitor within a predetermined amount of time;
   determine an amount of energy discharged to the one or more EVs from the energy source within the predetermined amount of time; and
   determine the energy demand value based on the amount of energy discharged to the one or more EVs from the at least one supercapacitor within the predetermined amount of time and the amount of energy discharged to the one or more EVs from the energy source within the predetermined amount of time.

7. A method implemented in a power-controlling device configured to be connected to two or more charging stations, each charging station being configured to provide power to one or more respective electric vehicles (EVs) via one or more respective outputs, the method comprising:
   determining that one of the respective EVs has connected to the power-controlling device via the respective output of one of the two or more charging stations, wherein the respective charging stations are fast-charging stations configured to provide power to the EV at a rate of at least 30 kilowatts (KW);
   determining an energy demand value; and comparing the energy demand value to a first threshold value, wherein the first threshold value is based on a geographical location of the power-controlling device, and wherein:

on a condition that the energy demand value is greater than the first threshold value, the method further comprises providing power to the EV from at least one supercapacitor configured to store energy received from an energy source;

on a condition that the energy demand value is not greater than the first threshold value, the method further comprises:
   providing power to the EV from the energy source;
   determining a power level of the at least one supercapacitor; and
     on a condition that the power level of the at least one supercapacitor is less than 100%, charging the at least one supercapacitor using energy from the energy source; and on the condition that the energy demand value is greater than the first threshold value, the method further comprises:
   determining that an amount of energy stored in the at least one supercapacitor is below a second threshold value; and
   providing power to the EV from the energy source at a rate that is less than a maximum rate;

wherein the method further comprises:
   measuring an amount of energy provided to the EV from the supercapacitor; and
   storing an indication of the amount of energy provided to the EV from the supercapacitor in a memory of the power-controlling device.

8. The method of claim 7, wherein power is provided to the EV at a rate of at least 50 kilowatts (KW).

9. The method of claim 7, wherein power is provided to the EV at a rate of at least 100 kilowatts (kW).

10. The method of claim 7, wherein the indication comprises a first indication, and the method further comprising:
   receiving a second indication from the fast-charging station that the EV has connected to the power-controlling device via the respective output of the fast-charging station; and
   determining that the EV has connected to the power-controlling device based on receiving the second indication.

11. The method of claim 7, wherein the first threshold value is determined based on a value that is stored in the memory of the power-controlling device.

12. The method of claim 7, wherein determining the energy demand value comprises:
   determining an amount of energy discharged to one or more EVs from the at least one supercapacitor within a predetermined amount of time;
   determining an amount of energy discharged to the one or more EVs from the energy source within the predetermined amount of time; and
   determining the energy demand value based on the amount of energy discharged to the one or more EVs from the at least one supercapacitor within the predetermined amount of time and the amount of energy discharged to the one or more EVs from the energy source within the predetermined amount of time.

* * * * *